(12) United States Patent
Xiao

(10) Patent No.: US 12,165,520 B2
(45) Date of Patent: Dec. 10, 2024

(54) HYBRID DISPATCH METHOD AND SERVER FOR AUTONOMOUS AND MANUALLY-DRIVEN VEHICLES

(71) Applicant: SHENZHEN ANTU AUTONOMOUS DRIVING TECHNOLOGIES LTD., Shenzhen (CN)

(72) Inventor: Jianxiong Xiao, Shenzhen (CN)

(73) Assignee: SHENZHEN ANTU AUTONOMOUS DRIVING TECHNOLOGIES LTD., Shenzhen (CN)

( * ) Notice: Subject to any disclaimer, the term of this patent is extended or adjusted under 35 U.S.C. 154(b) by 281 days.

(21) Appl. No.: 17/708,007

(22) Filed: Mar. 30, 2022

(65) Prior Publication Data

US 2022/0319334 A1 Oct. 6, 2022

(30) Foreign Application Priority Data

Mar. 30, 2021 (CN) .......................... 202110342452.8

(51) Int. Cl.
*G08G 1/00* (2006.01)
*B60W 60/00* (2020.01)
*G01C 21/34* (2006.01)
*G06Q 50/40* (2024.01)

(52) U.S. Cl.
CPC ....... *G08G 1/202* (2013.01); *B60W 60/00253* (2020.02); *G01C 21/343* (2013.01); *G06Q 50/40* (2024.01); *B60W 2556/40* (2020.02); *B60W 2556/45* (2020.02)

(58) Field of Classification Search
CPC ............ G08G 1/202; B60W 60/00253; B60W 2556/40; B60W 2556/45; G01C 21/343; G06Q 50/40
See application file for complete search history.

(56) References Cited

U.S. PATENT DOCUMENTS

| 2018/0308191 | A1* | 10/2018 | Matthiesen | ........ G01C 21/3407 |
| 2018/0315146 | A1* | 11/2018 | Matthiesen | ........ G01C 21/3461 |
| 2018/0336510 | A1* | 11/2018 | DaCosta | ............ G06Q 30/0633 |
| 2018/0357907 | A1* | 12/2018 | Reiley | .................... G08G 1/005 |
| 2019/0251496 | A1* | 8/2019 | DaCosta | ............ G06Q 30/0629 |
| 2020/0058092 | A1* | 2/2020 | Buttolo | ............ G06Q 10/06316 |
| 2020/0311846 | A1* | 10/2020 | Chen | ...................... G06Q 50/40 |

FOREIGN PATENT DOCUMENTS

| CN | 108460966 A | 8/2018 |
| CN | 109670614 A | 4/2019 |

* cited by examiner

*Primary Examiner* — Ryan Rink
(74) *Attorney, Agent, or Firm* — Hemisphere Law, PLLC; Zhigang Ma

(57) ABSTRACT

A hybrid dispatch method for autonomous vehicles and manually-driven vehicles is provided and includes steps of: receiving travel information from a terminal, the travel information including a start position and an end position; matching manually-driven vehicle adapted to the travel information according to manually-driven vehicle matching rules; determining whether the travel information meets compliance rules for autonomous vehicles; matching autonomous vehicles adapted to the travel information according to autonomous vehicle matching rules when the travel information meets the compliance rules for autonomous vehicles; providing the matched manually-driven vehicles and the matched autonomous vehicles to the terminal for the user to select. Furthermore, a server and a storage medium are also provided.

14 Claims, 4 Drawing Sheets

HYBRID DISPATCH METHOD AND SERVER FOR AUTONOMOUS AND MANUALLY-DRIVEN VEHICLES

CROSS REFERENCE TO RELATED APPLICATION

This non-provisional patent application claims priority under 35 U.S.C. § 119 from Chinese Patent Application No. 202110342452.8 filed on Mar. 30, 2021, the entire content of which is incorporated herein by reference.

TECHNICAL FIELD

The disclosure relates to the field of autonomous driving technology, and in particular to a hybrid dispatch method and a server for autonomous and manually-driven vehicles.

BACKGROUND

Nowadays, online car-hailing service is becoming more and more popular, which greatly facilitates people's travel.

With the emergence and development of autonomous vehicles, it is foreseeable that more and more autonomous vehicles will appear in the future of online car-hailing.

Most of existing car-hailing systems are used manually-driven vehicle, and some existing car-hailing systems using the autonomous vehicles, and the autonomous vehicles rely on high-definition three-dimensional maps and operation areas for the autonomous vehicles The operation areas are specified by local governments to allow the autonomous vehicles drive within.

Correspondingly, it will involve the scheduling of autonomous vehicles and manually-driven vehicle, that is, how to schedule matched vehicles to users after a user sends a travel request, so as to improve the user's travel efficiency.

Therefore, there is for improvement in assigning matched autonomous vehicles and manually-driven vehicle to users.

SUMMARY

The disclosure provides a control method for autonomous driving vehicle, and a computer device, the control method can control the autonomous driving vehicles to deal with the situation of waiting for timeouts in time.

A first aspect of the disclosure provides a hybrid dispatch method for autonomous vehicles and manually-driven vehicles, the hybrid dispatch method for autonomous vehicles and manually-driven vehicles includes the steps of: receiving travel information from a terminal, the travel information including a start position and an end position; matching manually-driven vehicle adapted to the travel information according to manually-driven vehicle matching rules; determining whether the travel information meets compliance rules for autonomous vehicles; matching autonomous vehicles adapted to the travel information according to autonomous vehicle matching rules when the travel information meets compliance rules for autonomous vehicles; providing the matched manually-driven vehicles and the matched autonomous vehicles to the terminal for the user to select.

A second aspect of the disclosure provides a server, the server comprises: a memory configured to store program instructions and a processor configured to execute the program instructions to enable the computer device to perform a hybrid dispatch method for autonomous vehicles and manually-driven vehicles, the hybrid dispatch method for autonomous vehicles and manually-driven vehicles includes the steps of: receiving travel information from a terminal, the travel information including a start position and an end position; matching manually-driven vehicle adapted to the travel information according to manually-driven vehicle matching rules; determining whether the travel information meets compliance rules for autonomous vehicles; matching autonomous vehicles adapted to the travel information according to autonomous vehicle matching rules when the travel information meets compliance rules for autonomous vehicles; providing the matched manually-driven vehicles and the matched autonomous vehicles to the terminal for the user to select.

A third aspect of the disclosure provides a storage medium, store a computer-executable program instruction, and the computer-executable program instructions are execute to perform a hybrid dispatch method for autonomous vehicles and manually-driven vehicles, the hybrid dispatch method for autonomous vehicles and manually-driven vehicles includes the steps of: receiving travel information from a terminal, the travel information including a start position and an end position; matching manually-driven vehicle adapted to the travel information according to manually-driven vehicle matching rules; determining whether the travel information meets compliance rules for autonomous vehicles; matching autonomous vehicles adapted to the travel information according to autonomous vehicle matching rules when the travel information meets compliance rules for autonomous vehicles; providing the matched manually-driven vehicles and the matched autonomous vehicles to the terminal for the user to select.

The hybrid dispatch method and a server for autonomous and manually-driven vehicle described above can dispatch users' orders in the autonomous and manually-driven vehicles.

BRIEF DESCRIPTION OF THE DRAWINGS

In order to illustrate the technical solution in the embodiments of the disclosure or the prior art more clearly, a brief description of drawings required in the embodiments or the prior art is given below. Obviously, the drawings described below are only some of the embodiments of the disclosure. For ordinary technicians in this field, other drawings can be obtained according to the structures shown in these drawings without any creative effort.

The realization, functional characteristics and advantages of the disclosure will be further described with reference to the accompanying drawings in conjunction with the embodiments.

DETAILED DESCRIPTION OF THE EMBODIMENTS

In order to make purpose, technical solution and advantages of the disclosure more clearly, the disclosure is further described in detail in combination with drawings and embodiments. It is understood that the specific embodiments described herein are used only to explain the disclosure and are not used to define it. On the basis of the embodiments in the disclosure, all other embodiments obtained by ordinary technicians in this field without any creative effort are covered by protection of the disclosure.

Terms "first", "second", "third", "fourth", if any, in specification, claims and drawings of this application are used to distinguish similar objects and need not be used to describe any particular order or sequence of priorities. It should be understood that data are interchangeable when appropriate, in other words, the embodiments described can be implemented in order other than what is illustrated or described here. In addition, terms "include" and "have" and any variation of them, can encompass other things. For example, processes, methods, systems, products, or equipment that comprise a series of steps or units need not be limited to those clearly listed, but may include other steps or units that are not clearly listed or are inherent to these processes, methods, systems, products, or equipment.

It is to be noted that description refers to "first", "second", etc. in the disclosure are for descriptive purpose only and neither be construed or implied relative importance nor indicated as implying number of technical features. Thus, feature defined as "first" or "second" can explicitly or implicitly include one or more features. In addition, technical solutions between embodiments may be integrated, but only on the basis that they can be implemented by ordinary technicians in this field. When the combination of technical solutions is contradictory or impossible to be realized, such combination of technical solutions shall be deemed to be non-existent and not within the scope of protection required by the disclosure.

Figure 1:
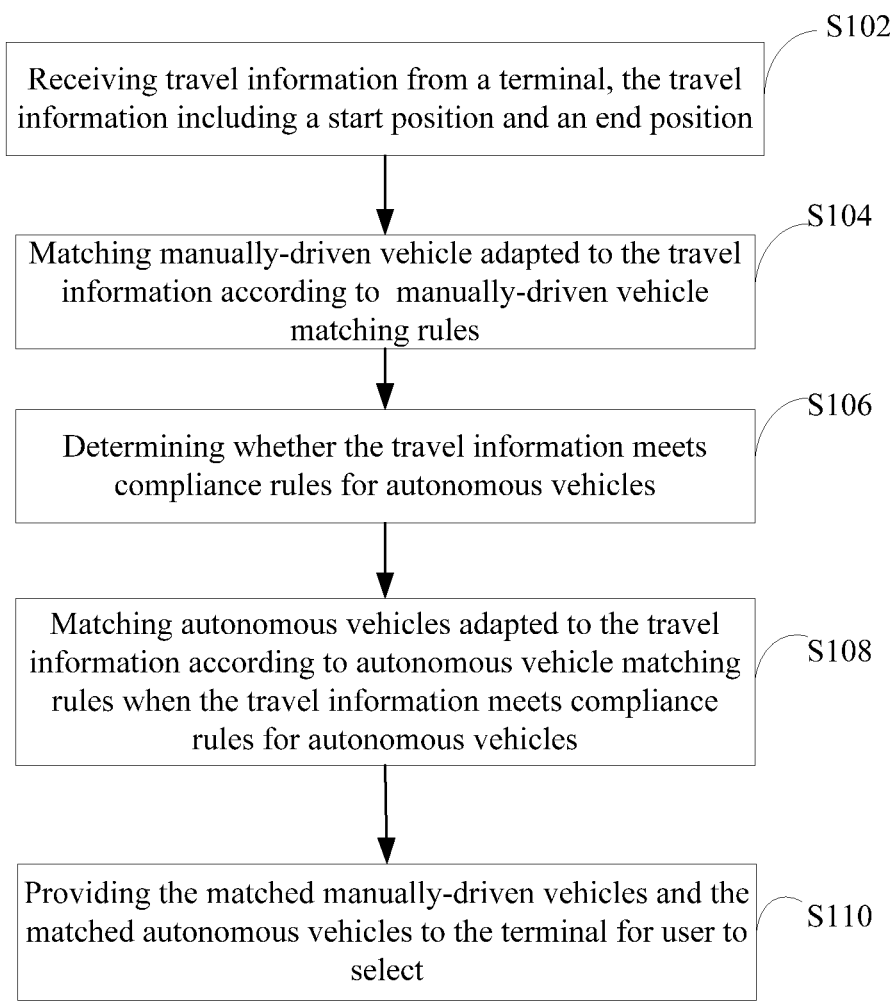
FIG. 1 is a flowchart of a hybrid dispatch method fora hybrid dispatch method and a server for autonomous and manually-driven vehicles in accordance with an embodiment.

Referring to FIG. 1, a hybrid dispatch method for autonomous vehicles and a manually-driven vehicle provided by an embodiment of the present invention, including the following steps of S102-S110.

In the step S102, travel information is received, the travel information includes a start position and an end position. In detail, the server receives the start position and the end position from terminals, the start position and the end position are input into the terminals via users. The server includes but is not limited to a tower server, a rack server, a blade server, a high-density server, a rack server, and a cloud server. The terminals include but are not limited to terminals such as mobile phones, computers, and tablet computers.

In the step S104, a manually-driven vehicle adapted to the travel information is matched according to manually-driven vehicle matching rules. How to match the manually-driven vehicle adapted to the travel information will be described in detail below.

In the step S106 it is determined that whether the travel information meets compliance rules for autonomous vehicles according to the travel information. In detail, the compliance rules for autonomous vehicles include that both the start position and the end position are located within ranges of allowing autonomous driving and located within areas covered by a high definition map; and a first route from the start position to the end position are located within the ranges of allowing autonomous driving and located within the areas covered by a high definition map. For example, the start position A and the end position B are both located within ranges of allowing autonomous driving and located within areas covered, by the high definition map, A route from the start position A to the end position B is located within the ranges of allowing autonomous driving and located within the areas covered by a high definition map.

In the step S108, autonomous vehicles adapted to the travel information are matched according to autonomous vehicle matching rules when the travel information meets compliance rules for autonomous vehicles. How to match autonomous vehicles adapted to the travel information will be described in detail below.

In the step S110, the matched manually-driven vehicle and the matched autonomous vehicles are provided to the terminal for the user to select. For example, in some embodiments, the autonomous vehicles and a manually-driven vehicle are provided for the user to select, and the user may select autonomous vehicles, or manually-driven vehicles, or autonomous vehicles and a manually-driven vehicle at the same time. In some embodiments, only manually driven vehicles are provided for user to select.

In the above-mentioned embodiment, the manually-driven vehicle matching with the travel information are matched out the user according to the manually-driven vehicle matching rules, and the autonomous vehicles matching with the travel information are matched out for the user. The order may be distributed to both the autonomous and manually-driven vehicles are effectively that saves operating costs and improves efficiency. It saves the travel time of the user provides convenience for the travel of the user, and enables the user to have a better experience.

Figure 2:
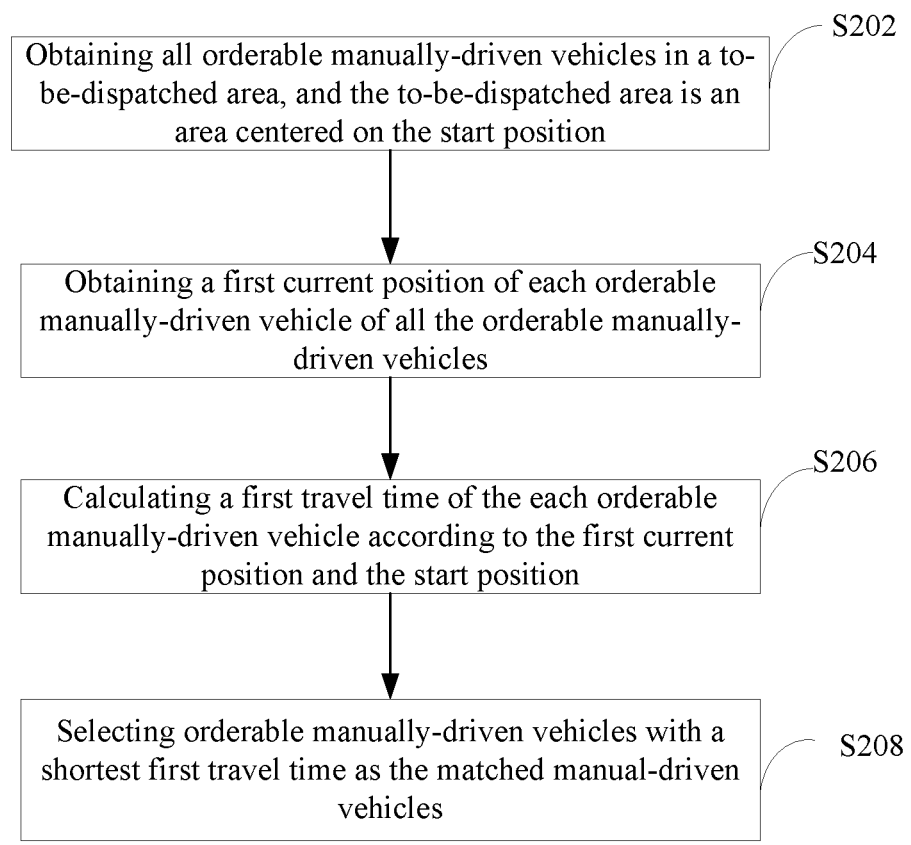
FIG. 2 is a schematic diagram of a sub-flow of step S104 in accordance with an embodiment.

Referring to FIG. 2, FIG. 2 illustrates a schematic diagram of a sub-flow of step S104 in accordance with an embodiment. The step S104 further includes the following steps of S202-S208.

In the step S202, all orderable manually-driven vehicles in an order-to-be-dispatched area are obtained, and the to-be-dispatched area is an area centered on the start position. In detail, the server obtains all manually-driven vehicles that can receive orders in the area to be dispatched according to the start position. In some embodiments, the manually-driven vehicles that can receive orders may be idle manually-driven vehicles at current or at next preset time. For example, the manually-driven vehicle A will be complete the order within one minute and located within the area-to-be-dispatched, the manually-driven vehicle A is also a manually-driven vehicle that can receive orders. In some embodiments, the area-to-be-dispatched may be preset circular area with a pre-set size and centered on the start position.

In the step S204, a first current position of each orderable manually-driven vehicle are obtained. In detail, the server obtains the first current positions of the manually-driven vehicles according to the positioning device of the manually-driven vehicle. The positioning device of the manually-driven vehicle includes but is not limited to the global positioning system(GPS), the BeiDou Navigation Satellite System(BDS), etc.

In the step S206, a first travel time of the each orderable manually-driven vehicle is calculated according to the first current position and the start position. The first travel time is a time taken for each orderable manually-driven vehicle to travel from the first current position to the start position In detail, the server calculates the first travel time for the each orderable manually-driven vehicle to go to the start position according to a road congestion situation and the first current position of each the orderable manually-driven vehicle.

In the step S208, orderable manually-driven vehicles with a shortest first travel time are selected as the matched manual-driven vehicles. The orderable manually-driven vehicles with a shortest first travel time can reach the start position as quickly as possible among the manually-driven vehicle, so as to reduce the user's waiting time and improve the user's experience. In this embodiment, more than one orderable manually-driven vehicles with a shortest first travel time are selected as the matched manual-driven vehicles. The shortest first travel time may be a value or may be a rang value such as a deviation range of a value. In detail, the orderable manually-driven vehicles with a shortest first travel time may be the orderable manually-driven vehicles with a same first travel time, such as 10 minutes; or the orderable manually-driven vehicles with a shortest first travel time may be the orderable manually-driven vehicles with first travel times with difference of the predetermined range, such as 2 minutes. For example, the shortest first travel time is 10, and the orderable manually-driven vehicles with the first travel time of 8-12 minutes are all selected as the matched manual-driven vehicles.

Figure 3:
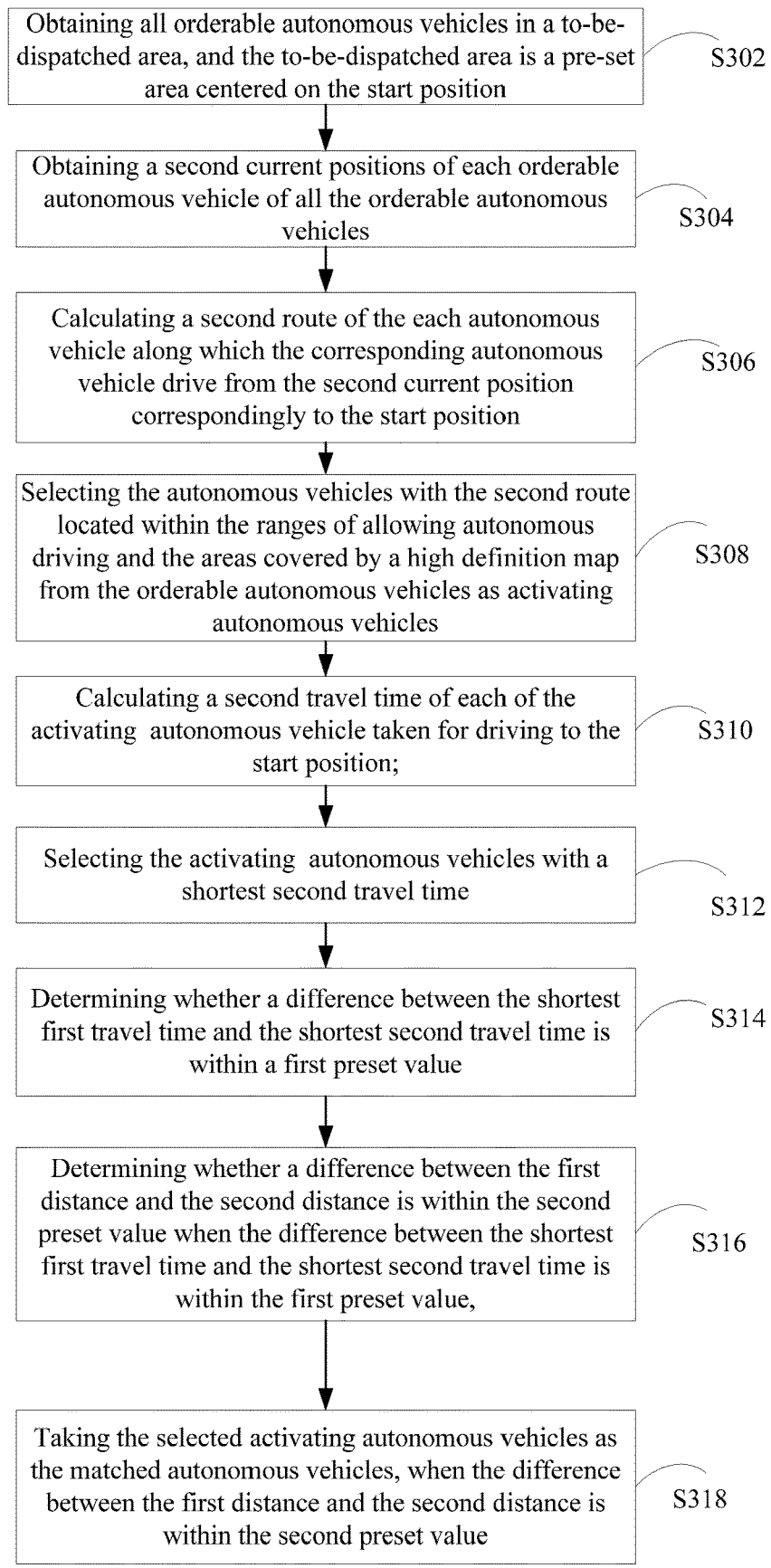
FIG. 3 is a schematic diagram of a sub-flow of step S108 in accordance with an embodiment.

Referring to FIG. 3, FIG. 3 illustrates a schematic diagram of a sub-flow of the step S108 in accordance with an embodiment. The step S108 includes the following steps of S302-S318.

In the step S302, all the orderable autonomous vehicles in a to-be-dispatched areas are obtained, and the to-be-dispatched area is a preset area centered on the start position. In detail, the server obtains all the orderable autonomous vehicles in the to-be-dispatched area according to the start position. In some embodiments, the orderable autonomous vehicles may be idle autonomous vehicles at current or at next preset time. For example, if the autonomous vehicle B completes the order after one minute and is in the to-be-dispatched area, the autonomous vehicle B is also the orderable autonomous vehicle. In some embodiments, the to-be-dispatched area may be the start position is a preset circular area with the center of the circle.

In the step S304, second current positions of all the orderable autonomous vehicles are obtained. In detail, the server obtains the second current position of each orderable autonomous vehicle according to a positioning device of the orderable autonomous vehicle. The positioning device of the orderable autonomous vehicle includes but is not limited to the global positioning system(GPS), the BeiDou Navigation Satellite System (BDS), etc.

In the step S306, a second route for each orderable autonomous vehicle to drive to the start position according is calculated according to the start position and the second current position. It is understood that one orderable autonomous vehicle can drive to the start position by a plurality of routes.

In the step S308, the autonomous vehicles with the second route located within the ranges of allowing autonomous driving and the areas covered by a high definition map from the orderable autonomous vehicles are taken as activating autonomous vehicles The activating autonomous vehicles have the second routes located within the ranges of allowing autonomous driving and located within the areas covered by a high definition map. In other words, as long as there is a route for the orderable autonomous vehicle to drive to the start position and the route is located within the ranges of allowing autonomous driving and located within the areas covered by a high definition map, the orderable autonomous vehicle will be selected as the activating autonomous vehicle.

In the step S310, a second travel time for each activating autonomous vehicle driving to the start position is calculated. For example, when there are a plurality of activating autonomous vehicles, time taken for each of the plurality of activating autonomous vehicles to drive to the start position needs to be calculated that prepare with a subsequent selection.

In the step S312, the activating autonomous vehicles with the shortest second travel time are selected as the matched autonomous vehicles. The activating autonomous vehicle with the shortest second travel time can reach the start position fastest that it reduce the user's waiting time and improves the user's experience.

In the step S314, it is determined that whether a difference between the shortest first travel time and the shortest second travel time is within a first preset value. The shortest first travel time is the time taken for manually-driven vehicle to reach the start position, and the shortest second travel time is the time for the autonomous vehicle to reach the start position. In some embodiments, the shortest first travel time is 15 minutes, the shortest second travel time is 16 minutes, the first preset difference is 5 minutes, and the difference between the shortest first travel time and the shortest second travel time is 1 minute is within the preset difference, and the user does not need to wait too long to get on the matched autonomous vehicle. In some embodiments, the shortest first travel time is 15 minutes, the shortest second travel time is 30 minutes, and the first preset difference is 5 minutes, and the difference is 15 minutes and not the first preset difference of 5 minutes when the matched autonomous vehicle is dispatched to pick up the user, the waiting time for users is too long.

In the step S316, it is determined that whether a difference between the first distance and the second distance is within a second preset value when the difference between the shortest first travel time and the shortest second travel time is within the first preset value. The first distance is the distance driven from the start position to the end position by the manually-driven vehicles, and the second distance is the distance driven from the start position to the end position by the autonomous vehicles. In some embodiments, the first distance is 10 km, the second distance is 15 km, and the second preset value is 2 km. The difference between the first distance and the second distance obviously exceeds the second preset value, and the second distance will generate more fees and costs more time that results in a bad car experience for users.

In the step S318, the matched autonomous vehicles and the matched manually-driven vehicles are provided to the terminal for the user select, when the difference between the first distance and the second distance is within the second preset value, In some embodiments, the first distance is 10 km, the second distance is 10.2 km, the second preset value is 2 km, and the difference 0.2 km is within the second preset value. At this time, there is no significant difference in the cost and time spent between autonomous vehicles and manually-driven vehicle, and the matched autonomous vehicles and the matched manually-driven vehicle are provided for the user to select.

In some embodiments, when the start position or end position or the first route is not located within ranges of allowing autonomous driving and located within areas covered by a high definition map, no autonomous vehicle is provided, and the matched manually-driven vehicles are provided to terminal for the user to select.

In some embodiments, when the start position is not located within ranges of allowing autonomous driving and located within areas covered by a high definition map, the matched manually-driven vehicles are provided to the terminal for the user to select.

In some embodiments, when the start position is located within ranges of allowing autonomous driving and located within areas covered by a high definition map, and the end position is not located within ranges of allowing autonomous driving and located within areas covered by a high definition map, the matched manually-driven vehicles are provided to the terminal for the user to select.

In some embodiments, when the start and end positions are located within ranges of allowing autonomous driving and located within areas covered by a high definition map, and there is no route from the start position to the end position located within ranges of allowing autonomous driving and located within areas covered by a high definition map, a matched manually-driven vehicles are provided to the terminal for the user to select.

In some embodiments, when the start position and the end position are located within ranges of allowing autonomous driving and located within areas covered by a high definition map, and there is a route from the start position to the end position located within ranges of allowing autonomous driving and located within areas covered by a high definition map, the shortest first travel time and the shortest first travel time and the difference between the first travel time and the second travel time is not within the first preset value, a matched manually-driven vehicles are provided to the terminal for the user to select.

In some embodiments, when the start position and the end position are located within ranges of allowing autonomous driving and located within areas covered by a high definition map, there is a route from the start position to the end position located within ranges of allowing autonomous driving and located within areas covered by a high definition map, the difference between the first distance and the second distance exceeds the second preset value, the matched manually-driven vehicles are provided to the user terminal for the user to select.

In some embodiments, when the start position and the end position are located within ranges of allowing autonomous driving and located within areas covered by a high definition map, there is a route from the start position to the end position located within ranges of allowing autonomous driving and located within areas covered by a high definition map, the difference between the shortest first travel time and the shortest first travel time is within the first preset value, and the difference between the first distance and the second distance exceeds the second preset value, a matched manually-driven vehicles are provided to the terminal for the user to select.

In some embodiments, when the start position and the end position are located within ranges of allowing autonomous driving and located within areas covered by a high definition map, there a route from the start position to the end position exists, the difference between the first distance and the second distance is within the second preset value, the difference between the shortest first travel time and the shortest second travel time exceeds the first preset value, the matched manually-driven vehicles are provided to the terminal for the user to select.

Figure 4:
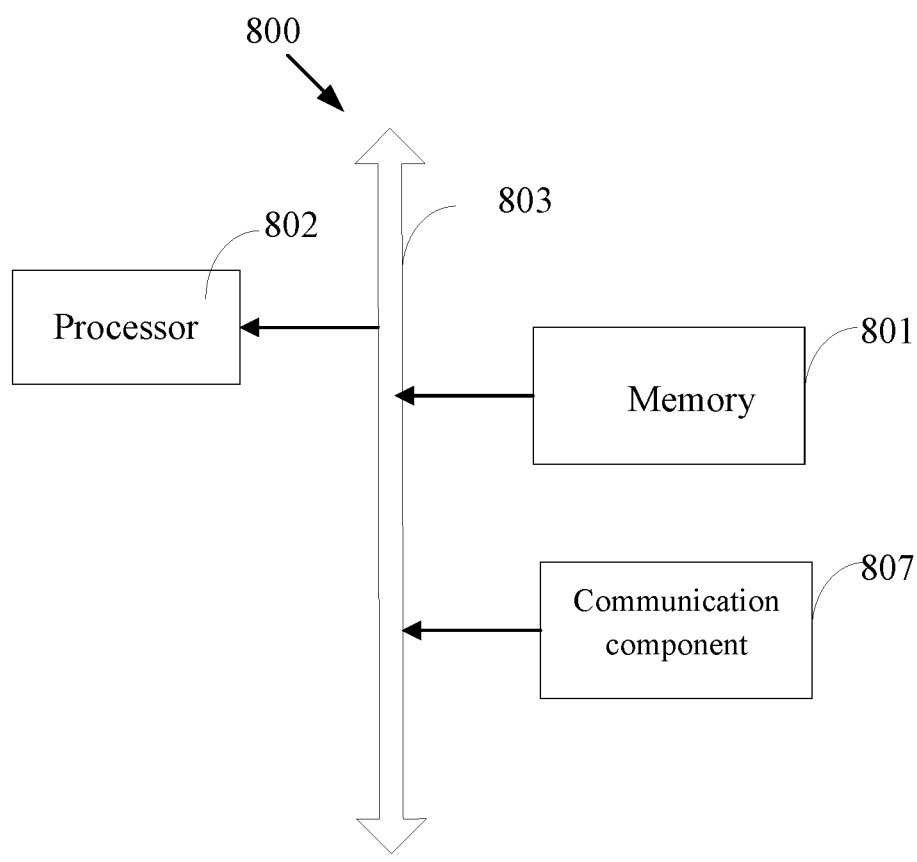
FIG. 4 is a schematic diagram of an internal structure of a server in accordance with an embodiment.

Referring to FIG. 4, FIG. 4 illustrates a schematic diagram of the internal structure of a server according to an embodiment. The server 800 also includes memory 801, processor 802 bus 803 and communication component 807.

The memory 801 includes at least one type of readable storage medium, including flash memory, hard disk, multimedia card, card-type memory (eg, SD or DX memory, etc.), magnetic memory, magnetic disk, optical disk, and the like. The memory 801 may be an internal storage unit of the server 800 in some embodiments, such as a hard disk of the server 800. In other embodiments, the memory 801 may also be an external server 800 storage device, such as a pluggable hard disk, a smart memory card (Smart Media Card, SMC), a secure digital (Secure Digital, SD) card equipped on the server 800, Flash card (Flash Card) and so on. Further, the memory 801 may also include both an internal storage unit of the server 800 and an external storage device. The storage 801 can be used not only for storing application software and various types of data installed in the server 800.

The bus 803 may be a peripheral component interconnect (PCI for short) bus or an extended industry standard architecture (extended industry standard architecture, EISA for short) bus, or the like. The bus can be divided into address bus, data bus, control bus and so on. For ease of presentation, only one thick line is used in FIG. 4, but it does not mean that there is only one bus or one type of bus.

Further, the server 800 may also include a communication component 807, and the communication component 807 may also include a wired communication component and/or a wireless communication component (such as a WI-FI communication component, a Bluetooth communication component, etc.), which is usually used to communicate with the server 800. A communication connection is established between external devices.

In some embodiments, the processor 802 may be a central processing unit (Central Processing Unit, CPU), controller, microcontroller, microprocessor, or other data processing chip, for executing program codes or processing stored in the memory 801 data.

In the above-mentioned embodiments, it may be implemented in whole or in part by software, hardware, firmware or any combination thereof. When implemented in software, it can be implemented in whole or in part in the form of a computer program product.

The computer program product includes one or more computer instructions. When the computer program instructions are loaded and executed on a computer, a process or function according to the embodiment of the disclosure is generated in whole or in part. The computer device may be a general-purpose computer, a dedicated computer, a computer network, or other programmable device. The computer instruction can be stored in a computer readable storage medium, or transmitted from one computer readable storage medium to another computer readable storage medium. For example, the computer instruction can be transmitted from a web site, computer, server, or data center to another web site, computer, server, or data center through the cable (such as a coaxial cable, optical fiber, digital subscriber line) or wireless (such as infrared, radio, microwave, etc.). The computer readable storage medium can be any available medium that a computer can store or a data storage device such as a serve or data center that contains one or more available media integrated. The available media can be magnetic (e.g., floppy Disk, hard Disk, tape), optical (e.g., DVD), or semiconductor (e.g., Solid State Disk), etc.

The technicians in this field can clearly understand the specific working process of the system, device and unit described above, for convenience and simplicity of description, can refer to the corresponding process in the embodiment of the method described above, and will not be repeated here.

In the several embodiments provided in this disclosure, it should be understood that the systems, devices and methods disclosed may be implemented in other ways. For example, the device embodiments described above is only a schematic. For example, the division of the units, just as a logical functional division, the actual implementation can have other divisions, such as multiple units or components can be combined with or can be integrated into another system, or some characteristics can be ignored, or does not perform. Another point, the coupling or direct coupling or communication connection shown or discussed may be through the indirect coupling or communication connection of some interface, device or unit, which may be electrical, mechanical or otherwise.

The unit described as a detached part may or may not be physically detached, the parts shown as unit may or may not be physically unit, that is, it may be located in one place, or it may be distributed across multiple network units. Some or all of the units can be selected according to actual demand to achieve the purpose of this embodiment scheme.

In addition, the functional units in each embodiment of this disclosure may be integrated in a single processing unit, or may exist separately, or two or more units may be integrated in a single unit. The integrated units mentioned above can be realized in the form of hardware or software functional units.

The integrated units, if implemented as software functional units and sold or used as independent product, can be stored in a computer readable storage medium. Based on this understanding, the technical solution of this disclosure in nature or the part contribute to existing technology or all or part of it can be manifested in the form of software product. The computer software product stored on a storage medium, including several instructions to make a computer equipment (may be a personal computer, server, or network device, etc.) to perform all or part of steps of each example embodiments of this disclosure. The storage medium mentioned before includes U disk, floating hard disk, ROM (Read-Only Memory), RAM (Random Access Memory), floppy disk or optical disc and other medium that can store program codes.

It should be noted that the embodiments number of this disclosure above is for description only and do not represent the advantages or disadvantages of embodiments. And in this disclosure, the term "including", "include" or any other variants is intended to cover a non-exclusive contain. So that the process, the devices, the items, or the methods includes a series of elements not only include those elements, but also include other elements not clearly listed, or also include the inherent elements of this process, devices, items, or methods. In the absence of further limitations, the elements limited by the sentence "including a . . . " do not preclude the existence of other similar elements in the process, devices, items, or methods that include the elements.

The above are only the preferred embodiments of this disclosure and do not therefore limit the patent scope of this disclosure. And equivalent structure or equivalent process transformation made by the specification and the drawings of this disclosure, either directly or indirectly applied in other related technical fields, shall be similarly included in the patent protection scope of this disclosure.

The invention claimed is:

1. A hybrid dispatch method for autonomous vehicles and manually-driven vehicles, comprising:
receiving travel information from a terminal, the travel information including a start position and an end position;
matching manually-driven vehicle adapted to the travel information according to manually-driven vehicle matching rules;
determining whether the travel information meets compliance rules for autonomous vehicles;
matching autonomous vehicles adapted to the travel information according to autonomous vehicle matching rules when the travel information meets the compliance rules for the autonomous vehicles;
providing the matched manually-driven vehicles and the matched autonomous vehicles to the terminal for the user to select;
wherein matching manually-driven vehicles adapted to the travel information according to manually-driven vehicles matching rules comprises:
obtaining all orderable manually-driven vehicles in a to-be-dispatched area, and the to-be-dispatched area is an area centered on the start position, the orderable manually-driven vehicles being idle manually-driven vehicles at current or at next preset time;
obtaining a first current position of each orderable manually-driven vehicle of all the orderable manually-driven vehicles;
calculating a first travel time of the each orderable manually-driven vehicle according to the first current positions and the start position, the first travel time is a time taken for the each orderable manually-driven vehicle to travel from the first current position to the start position;
selecting orderable manually-driven vehicles with a shortest first travel time as the matched manual-driven vehicles;
wherein matching autonomous vehicles adapted to the travel information according to the autonomous vehicle matching rules comprises:
obtaining all orderable autonomous vehicles in a to-be-dispatched area, and the to-be-dispatched area is a pre-set area centered on the start position;
obtaining a second current position of each orderable autonomous vehicle of all the orderable autonomous vehicles;
calculating a second route of each autonomous vehicle of all the orderable autonomous vehicles along which the corresponding autonomous vehicle drives from the second current position correspondingly to the start position;
selecting the autonomous vehicles with the second route located within the ranges of allowing autonomous driving and the areas covered by a high definition map from the orderable autonomous vehicles as activating autonomous vehicles; and
calculating a second travel time of each of the activating autonomous vehicle taken for driving to the start position;
selecting the activating autonomous vehicles with a shortest second travel time;
determining whether a difference between the shortest first travel time and the shortest second travel time is within a first preset value;
when the difference between the shortest first travel time and the shortest second travel time is within the first preset value, determining whether the difference between a first distance and a second distance is within a second preset value the first distance is the distance for each the manually-driven vehicle to drive from the start position to the end position, and the second distance is the distance for each autonomous vehicle to drive from the start position to the end position;
taking the selected activating autonomous vehicles as the matched autonomous vehicles, when the difference between the first distance and the second distance is within the second preset value.

2. The hybrid dispatch method for autonomous vehicles and manually-driven vehicles of claim 1, wherein the compliance rules for the autonomous vehicles include that both the start position and the end position are located within areas of allowing autonomous driving and the areas covered by a high definition map; and a first route from the start position to the end position are located within the ranges of allowing autonomous driving and the areas covered by a high definition map.

3. The hybrid dispatch method for autonomous vehicles and manually-driven vehicles of claim 2, wherein matching autonomous vehicles adapted to the travel information according to the autonomous vehicle matching rules when the travel information meets the compliance rules for the autonomous vehicles, comprising:
   determining whether the start position, the end position, and the first route of the autonomous vehicles are all located within the ranges of allowing autonomous driving and the areas covered by a high definition map;
   taking the autonomous vehicles with the start position, the end position and the first route of the autonomous vehicles located within the ranges of allowing autonomous driving and the areas covered by a high definition map as the matched autonomous vehicles.

4. The hybrid dispatch method for autonomous vehicles and manually-driven vehicles of claim 2, further comprising:
   determining whether the start position, the end position and the first route are all located within the ranges of allowing autonomous driving and the areas covered by a high definition map;
   matching manually-driven vehicles adapted to the travel information according to manually-driven vehicle matching rules, when the start position, the end position, or the first route is not located within the ranges of allowing autonomous driving and the areas covered by a high definition map.

5. The hybrid dispatch method for autonomous vehicles and manually-driven vehicles of claim 1, further comprising
   failing matching the autonomous vehicles, when the difference between the shortest first travel time and the shortest second travel time is not within the first preset value.

6. The hybrid dispatch method for autonomous vehicles and manually-driven vehicles of claim 1, further comprises:
   failing matching the autonomous vehicles, when the difference between the first distance or the second distance is within the second preset value is not within the second preset value.

7. A server, the server comprises:
   a memory configured to store program instructions, and
   a processor, the memory configured to execute the program instructions to enable the server perform a hybrid dispatch method for autonomous vehicles and manually-driven vehicles, the hybrid dispatch method for autonomous vehicles and manually-driven vehicles comprising:
   receiving travel information from a terminal, the travel information including a start position and an end position;
   matching manually-driven vehicle adapted to the travel information according to manually-driven vehicle matching rules;
   determining whether the travel information meets compliance rules for autonomous vehicles;
   matching autonomous vehicles adapted to the travel information according to autonomous vehicle matching rules when the travel information meets the compliance rules for autonomous vehicles;
   providing the matched manually-driven vehicles and the matched autonomous vehicles to the terminal for the user to select;
   wherein matching autonomous vehicles adapted to the travel information according to the autonomous vehicle matching rules comprises:
   obtaining all orderable autonomous vehicles in a to-be-dispatched area, and the to-be-dispatched area is a pre-set area centered on the start position;
   obtaining a second current position of each orderable autonomous vehicle of all the orderable autonomous vehicles;
   calculating a second route of each autonomous vehicle of all the orderable autonomous vehicles along which the corresponding autonomous vehicle drives from the second current position correspondingly to the start position;
   selecting the autonomous vehicles with the second route located within the ranges of allowing autonomous driving and the areas covered by a high definition map from the orderable autonomous vehicles as activating autonomous vehicles; and
   calculating a second travel time of each of the activating autonomous vehicle taken for driving to the start position;
   selecting the activating autonomous vehicles with a shortest second travel time;
   determining whether a difference between the shortest first travel time and the shortest second travel time is within a first preset value;
   when the difference between the shortest first travel time and the shortest second travel time is within the first preset value, determining whether the difference between a first distance and a second distance is within a second preset value the first distance is the distance for each the manually-driven vehicle to drive from the start position to the end position, and the second distance is the distance for each autonomous vehicle to drive from the start position to the end position;
   taking the selected activating autonomous vehicles as the matched autonomous vehicles, when the difference between the first distance and the second distance is within the second preset value.

8. The server of claim 7, wherein the compliance rules for the autonomous vehicles include that both the start position and the end position are located within ranges of allowing autonomous driving and areas covered by a high definition map; and a first route from the start position to the end position are located within the ranges of allowing autonomous driving and the areas covered by a high definition map.

9. The server of claim 8, wherein matching autonomous vehicles adapted to the travel information according to autonomous vehicle matching rules when the travel information meets compliance rules for autonomous vehicles, comprising:
   determining whether the start position, the end position, and the first route of the autonomous vehicles are all located within the ranges of allowing autonomous driving and the areas covered by a high definition map;
   taking the autonomous vehicles with the start position, the end position and the first route of the autonomous vehicles located within the ranges of allowing autonomous driving and the areas covered by a high definition map as the matched autonomous vehicles.

10. The server of claim 8, further comprising:
  determining whether the start position, the end position and the first route are all located within the ranges of allowing autonomous driving and the areas covered by a high definition map;
  matching manually-driven vehicle adapted to the travel information according to manually-driven vehicle matching rules, when the start position, the end position, or the first route is not located within the ranges of allowing autonomous driving and the areas covered by a high definition map.

11. The server of claim 7, further comprises:
  failing matching the autonomous vehicles, when the difference between the shortest first travel time and the shortest second travel time is not within the first preset value.

12. The server of claim 7, further comprises:
  failing matching the autonomous vehicles, when the difference between the difference between the first distance or the second distance is within the second preset value is not within the second preset value.

13. A storage medium, configured to store a computer-executable program instruction, and the computer-executable program instructions are execute to perform a hybrid dispatch method for autonomous vehicles and manually-driven vehicles, the hybrid dispatch method for autonomous vehicles and manually-driven vehicles comprising:
  receiving travel information from a terminal, the travel information including a start position and an end position;
  matching manually-driven vehicle adapted to the travel information according to manually-driven vehicle matching rules;
  determining whether the travel information meets compliance rules for autonomous vehicles;
  matching autonomous vehicles adapted to the travel information according to autonomous vehicle matching rules when the travel information meets the compliance rules for autonomous vehicles;
  providing the matched manually-driven vehicles and the matched autonomous vehicles to the terminal for the user to select;
  wherein matching autonomous vehicles adapted to the travel information according to the autonomous vehicle matching rules comprises:
    obtaining all orderable autonomous vehicles in a to-be-dispatched area, and the to-be-dispatched area is a pre-set area centered on the start position;
    obtaining a second current position of each orderable autonomous vehicle of all the orderable autonomous vehicles;
    calculating a second route of each autonomous vehicle of all the orderable autonomous vehicles along which the corresponding autonomous vehicle drives from the second current position correspondingly to the start position;
    selecting the autonomous vehicles with the second route located within the ranges of allowing autonomous driving and the areas covered by a high definition map from the orderable autonomous vehicles as activating autonomous vehicles; and
    calculating a second travel time of each of the activating autonomous vehicle taken for driving to the start position;
    selecting the activating autonomous vehicles with a shortest second travel time;
    determining whether a difference between the shortest first travel time and the shortest second travel time is within a first preset value;
    when the difference between the shortest first travel time and the shortest second travel time is within the first preset value, determining whether the difference between a first distance and a second distance is within a second preset value the first distance is the distance for each the manually-driven vehicle to drive from the start position to the end position, and the second distance is the distance for each autonomous vehicle to drive from the start position to the end position;
    taking the selected activating autonomous vehicles as the matched autonomous vehicles, when the difference between the first distance and the second distance is within the second preset value.

14. The storage medium of claim 13, wherein the compliance rules for the autonomous vehicles include that both the start position and the end position are located within ranges of allowing autonomous driving and areas covered by a high definition map; and a first route from the start position to the end position are located within the ranges of allowing autonomous driving and the areas covered by a high definition map.

* * * * *